(No Model.)
C. H. TWIST.
VEHICLE SPRING.
No. 354,877. Patented Dec. 21, 1886.
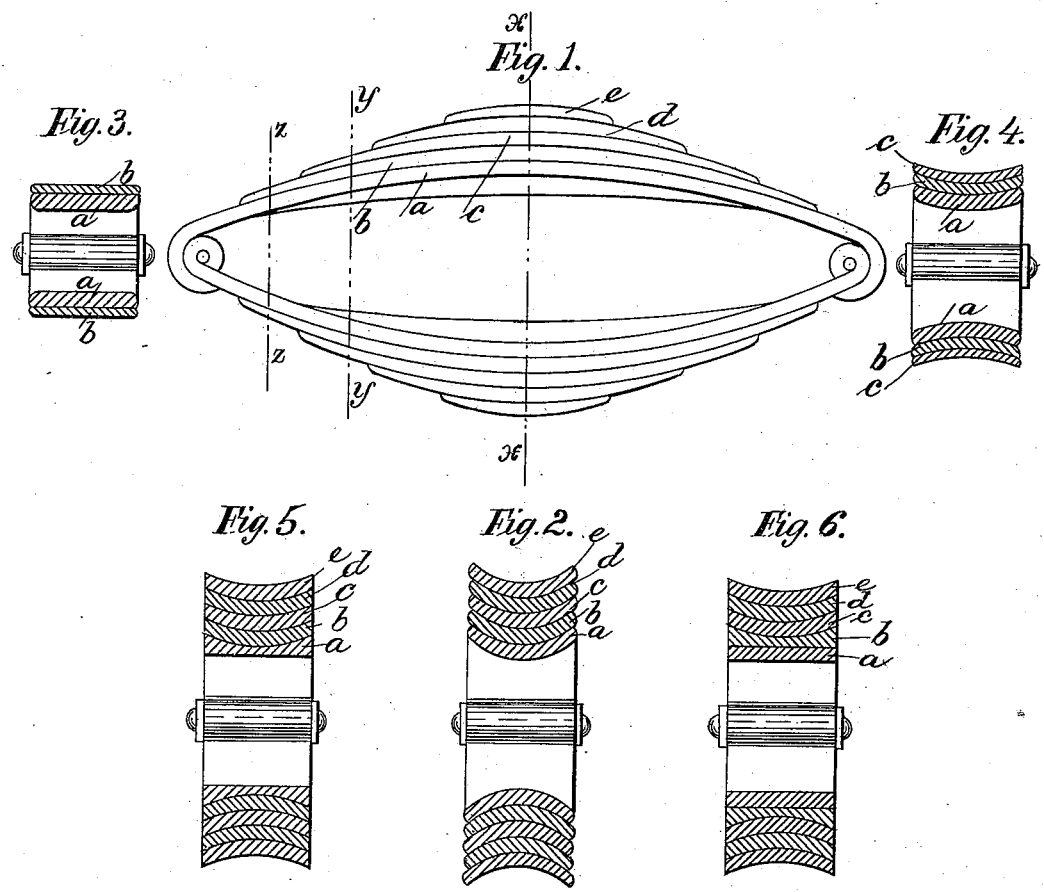
Witnesses:—
Edw. F. Tourtellotte.
Edmund J. Walsh.
Inventor
Charles H. Twist
By
Hubert A. Banning
Attorney

UNITED STATES PATENT OFFICE.

CHARLES H. TWIST, OF NEW YORK, N. Y.

VEHICLE-SPRING.

SPECIFICATION forming part of Letters Patent No. 354,877, dated December 21, 1886.

Application filed May 20, 1886. Serial No. 202,819. (No model.)

*To all whom it may concern:*

Be it known that I, CHARLES H. TWIST, of the city of New York, in the county and State of New York, have invented certain new and useful Improvements in Vehicle-Springs, of which the following is such a full, clear, concise, and exact description as will enable others skilled in the art to which my invention appertains to make and use the same, reference being had to the accompanying drawings, forming part of this specification.

In the use of springs for wagons, cars, and other vehicles requiring elliptic, half-elliptic, and half springs—that is, springs which are not elliptical or half-elliptical in shape, but such as side-bar springs, platform-springs, &c.—certain difficulties have been experienced, owing to the want of a proper distribution of the strength and elasticity of the metal from which such springs are made. Springs which possess the necessary strength have been found to want more elasticity than was consistent with the form into which the metal was shaped; and so, too, springs which have been made sufficiently elastic have lacked strength. Elliptic and half-elliptic and half springs in which the leaves are flat may be made sufficiently elastic; but when so the center of the spring, which of necessity must bear the weight, is generally wanting in strength, and consequently such springs usually break midway between the ends. In springs having their leaves made concave or concavo-convex in cross-section there is sufficient strength in the center; but as the concavity and convexity have heretofore been made to extend from one end of the leaf to the other the ends of the leaves do not have sufficient elasticity, and consequently, as the strain is conveyed from the mid portion to the ends, where the yield must eventually take place, the want of sufficient elasticity causes such springs to break near the ends; and not only so, the pressure upon such a spring causes the leaves to "buckle" and flatten out in places when bent beyond a straight line, or the reverse of their original shape or curvature.

The object of my invention is to secure a more perfect combination and distribution of strength and elasticity in the construction of elliptic, half-elliptic, and half springs than has heretofore been attainable; and it consists in the construction of one or more leaves with the central or mid portion made concavo-convex in cross-section, and which is made to taper from such concavo-convex shape to a flat surface, the ends being made flat; and, further, in the construction and arrangement of the leaves, when the spring is made up of a number of leaves, as hereinafter more fully described and claimed.

In the drawings, Figure 1 is a side elevation of an elliptic spring, each half of which is composed of several leaves which are concavo-convex in cross-section at the center or mid portion, as appears in Fig. 2, which is a sectional view taken on the line *x x* of Fig. 1. Fig. 3 is a cross-section taken on the line *z z* of Fig. 1, and shows the flat surface of the ends of the two lower leaves of the spring. Fig. 4 is a cross-section taken on the line *v v* of Fig. 1, and shows the leaves of the spring less concave than at the center, but not quite flat; but this figure shows the manner in which the leaves taper from the concave to the flat form by gradually becoming more and more flattened until they reach a flat surface, in which shape the ends are made. Fig. 5 is a central cross-section of a modified form of spring, and shows the main or longest leaf as being made plano-concave in form at the center, while the other leaves are concavo-convex; but each leaf in such spring tapers into a flat surface at the ends, as do those of the spring shown in Fig. 1 and its cross-sections, Figs. 3 and 4. Fig. 6 is a central cross-section of another modification, and shows a spring in which the main or longest leaf is made flat its entire length, while the next leaf is plano-concave, like the main leaf of the spring shown in Fig. 5.

In the drawings I have shown a spring composed of five leaves, *a b c d e;* but the number of leaves is an immaterial matter, and is to be regulated by the requirements which are to be met in its practical use. Where several leaves are used they may be placed together, one upon another, and secured in the ordinary way. In making the leaves, however, and in preparing them for use, I make the mid portion concavo-convex in cross-section, and from a certain distance on each side of the center I taper them, so that they gradually pass from a concavo-convex form to a flat surface, the ends being made flat. This shape may be given by a die or suitable tools, and of course each leaf will begin to taper at practically the same distance from the center, so that a snug fit of one leaf upon another may be obtained. This will make the flat portion of the main leaf longer than that on any other leaf, and consequently some of the shorter leaves may not reach a flat surface at the ends, especially if there be many leaves in the spring; but this will not impair the elasticity, which will be carried on the longer leaves and terminate in a yielding at the ends, to which point the strain will extend in any event. The main leaf and the one next to it are the ones which must be depended upon for the most elasticity, and they of course have the greatest amount of flat surface.

In making a single-leaf spring I may use one leaf which is concavo-convex in the center, and which tapers to a flat surface at the ends, or I may use a leaf which is plano-concave— that is, having one flat side, while the other is made concave. So, also, in using a number of leaves to compose the spring, I may make the main leaf plano-concave, as shown in Fig. 5; or I may have a flat main leaf, as shown in Fig. 6, in which case the second leaf is made plano-concave and the others concavo-convex; or if the spring to be constructed is a heavy one, containing a large number of leaves, I may use several flat leaves, always putting a leaf plano-concave in shape between the flat leaves and the concavo-convex-shaped leaves. In each case, however, the leaves which furnish the elasticity are made flat at the ends. The other leaves, which furnish the necessary strength in the center, being shorter, may not taper sufficiently to remove the concavo-convex surface.

By making a spring in the manner explained I am enabled to combine the desirable elements of a spring having concavo-convex leaves, which give strength in the center, with the yielding qualities at the ends of a spring having flat leaves, thus making a more durable spring without increasing the cost.

Having thus described my invention, what I claim as new, and desire to secure by Letters Patent, is—

1. A vehicle-spring having one or more leaves which are concavo-convex in cross-section midway between the ends, the same being made to taper toward the ends from a concavo-convex surface to a flat surface, and the ends whereof are flat, substantially as and for the purpose set forth.

2. In a vehicle-spring, a leaf made plano-concave in cross-section midway between the ends, the concave surface whereof is made to taper into a flat surface, the ends of such leaf being made flat, substantially as described.

3. A vehicle-spring having its longest leaf made flat, and a leaf above the same made plano-concave in cross-section midway between the ends, the concave surface of said leaf being made to taper into a flat surface at the ends, substantially as described.

CHAS. H. TWIST.

Witnesses:
   CHAS. A. REED,
   E. J. WALSH.